United States Patent Office 3,318,765
Patented May 9, 1967

3,318,765
FUNGICIDAL 2,2-BIS-(PARA-ALLYLOXY-PHENYL)PROPANE
Max J. Fielding and Bert L. Richards, Jr., Wilmington, Del., assignors to E. I. du Pont de Nemours and Company, Wilmington, Del., a corporation of Delaware
No Drawing. Filed Dec. 18, 1964, Ser. No. 419,574
6 Claims. (Cl. 167—30)

This invention relates to the use of chemicals to protect plants from soil fungi.

More specifically, it refers to a method for protecting plants from soil fungi such as Rhizoctonia spp. by applying to soil a plant protectant amount of a compound of the following formula:

(I)

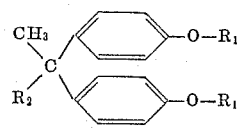

wherein $R_1$ is allyl, chloroallyl, methylallyl, propargyl, or methylpropargyl; and
$R_2$ is methyl or ethyl.

According to the 1953 Yearbook of the U.S. Department of Agriculture the average annual loss from plant diseases in the United States is estimated to be about three billion dollars. A projected world-wide figure based on that amount would exceed ten billion dollars. A large portion of this loss is due directly to the action of soil fungi.

Among the many soil fungi, few are more widespread or have a broader spectrum of host plants than Rhizoctonia spp. The species *Rhizoctonia solani* alone attacks hundreds of kinds of plants causing blights and rots. Among the plants attacked by *Rhizoctonia solani* some of the more important are the following: (1) field crops including alfalfa, cotton, peanuts, sugar beets, sugar cane and soybean; (2) ornamentals and house plants such as aster, begonia, calendula, calla, camellia, carnation, chrysanthemum, coleus, cornflower, dahlia, delphinium, geranium, iris, lily, orchid, pansy, poinsetta, primrose, salsify and sunflower; (3) cereals and grasses including barley, bentgrass, Bermuda grass, Kentucky blue grass, fescues, lawn grasses, rye, St. Augustine, oats and wheat; and (4) truck crops such as beans, beets carrots, cucumbers, egg plant, lettuce, onions, peas, peppers, potatoes, pumpkins, radish, rhubarb, squash, sweet potatoes, strawberries, tomato and watermelon.

*Rhizoctonia solani* makes its appearance in plants in several forms. For example, in cotton it appears as "sore-shin," in soybeans it appears as root rot and blight, and in alfalfa it causes foliage blight, crown rot and root canker.

Other species of Rhizoctonia, such as *R. zeae, R. corcorum, R. bataticola, R. ramicola,* and *R. tuliparium* attack some of the plants that *Rhizoctonia solani* attacks as well as others such as ash, asparagus, catalpa, chinaberry, corn, crape myrtle, crocus, elm, garlic, guava, marigold, mulberry, pittosporum, pyracantha, rhododendron, tulip and zinnia.

Rhizoctonia spp. are prevalent in varying degrees of severity throughout every state in the United States as well as in most of the rest of the world. They are capable of persisting in the soil for many years even though no cultivated crops are being grown.

Thus a practical and satisfactory method of protecting growing plants from Rhizoctonia spp. is a continued goal of the industry. Such a method, to be most useful, should protect the plant from Rhizoctonia spp. while exhibiting no adverse side effects on the plant itself.

We have discovered that the compounds of this invention possess outstanding plant protectant activity against Rhizoctonia spp. while exhibiting no apparent phytotoxicity to the protected plants, when applied to the soil in normal commercial fungicidal dosages.

Additionally, the compounds which we use in this invention protect the plants from Rhizoctonia spp. at low rates. The protection extends throughout the growing season, and there is no apparent residual effect which will tamper with the ecology of the surrounding area.

The plant protectant compounds of our invention are viscous oils or low melting solids which can be prepared by methods such as the one disclosed in Jelinek, U.S. Patent No. 2,560,350, issued July 10, 1951.

COMPOSITIONS

Plant protectant compositions of this invention can comprise one of the compounds of Formula I as the active ingredient, and one or more surface-active agents.

The surface-active agents or surfactant can include any of the anionic, cationic and non-ionic surface-active agents. Suitable surface-active agents, for example, are set forth in "Detergents and Emulsifiers—1964 Annual" by John W. McCutcheon, Inc.

Among the more preferred surfactants are those anionic agents. Suitable surface-active agents, for example, are and non-ionic agents recognized in the art as wetting agents, detergents or emulsifiers. Among the anionic surfactants, preferred ones are alkali metal or amine salts of alkylbenzenesulfonic acids such as dodecylbenzenesulfonic acid, fatty alcohol sulfates such as sodium lauryl sulfate, alkylnaphthalene sulfonates, sodium N-methyl-N-oleoyltaurate, fatty acid esters of sodium isethionate, dioctyl sodium sulfosuccinate and sodium dodecyldiphenyl oxide disulfonate. Among the non-ionic compounds, the preferred members are alkylphenoxy poly(ethyleneoxy)ethanols such as nonylphenol adducts with ethylene oxide; trimethylnonyl polyethylene glycol ethers, polyethylene oxide adducts to fatty and rosin acid, adducts of long chain alcohols or mercaptans with ethylene oxide, ethylene oxide adducts to esters of sorbitol with fatty acids, and ethylene oxide propylene oxide condensates.

Most preferred anionic surfactants, because of improved dissemination of the active ingredient, are salts of alkylnaphthalene or alkylbenzene sulfonic acids, or of dialkyl sulfosuccinic acids.

Most preferred non-ionic surfactants, because of improved dissemination of the active ingredient, are ethylene oxide adducts to alkylphenol, to long chain alkyl alcohols containing eight through fourteen carbon atoms, to long chain alkylmercaptans containing eight through fourteen carbon atoms or to sorbitan fatty acid esters.

Members of the class of surfactants known as "dispersants" are used in wettable powders to insure stable, finely divided suspensions when these products are slurried in water. Preferred dispersants are sodium and calcium lignin sulfonates, methylated cellulose and salts of polymerized alkylarylsulfonic acids and alkylnaphthalenesulfonic acids.

Most preferred are lignin sulfonates and methylated cellulose.

Surfactants can be present in compositions in this invention in amounts up to 20% by weight. However, a range of 0.2 to 10% by weight is preferred.

Low strength compositions containing 1 to 5% by weight of a compound of formula I can contain common liquid solvents with or without surfactant present. Such solvents as alcohols, ketones, chlorinated hydrocarbons, cellosolves, aliphatic and aromatic hydrocarbons, N,N-dialkyl amides and dialkylsulfoxides are satisfactory.

Particularly suitable liquid solvents include xylene, alkylated naphthalene, cyclohexane, cyclohexanone, chloroethanes, isophorone and dimethylformamide. Solvents having low phytotoxicity can also be used. Among these are white oils, isoparaffins and other hydrocarbons having a low sulfonatable residue.

Low strength compositions containing one or more of the above-mentioned solvents can be used for direct application to the soil.

Additionally, a compound of Formula I can be formulated into more concentrated emulsifiable solutions containing 10 to 75% by weight of active ingredient, plus solvent and emulsifiers to make up 100%. The solvents can be water insoluble. Typical of the solvents used are higher ketones, higher aliphatic and aromatic hydrocarbons, chlorinated hydrocarbons and the like.

Preferred in the less concentrated solutions are solvents of low phytotoxicity such as the lower viscosity white mineral oils and isoparaffins such as the "Soltrols."

Additional compositions can be formulated by adding a free-flowing inert powder to the active ingredient to form a dust.

Free-flowing inert powders can be any of the extenders commonly employed in the fungicide art. They can include inert finely divided diluents such as natural clays including attapulgite, montmorillonite or kaolinite, diatomaceous earth, pyrophyllite, talc, synthetic mineral fillers derived from silica and silicates such as synthetic fine silica and synthetic calcium or magnesium silicate, carbonates, phosphates, and sulfates, sulfur, lime and such flours as wood, walnut shell, redwood, soybean, and cottonseed. For improved stability, diluents containing active acidic sites, such as attapulgite, can be inactivated with minor amounts of additives such as urea and hexamethylenetetramine. This can be a particular benefit where the compound of Formula I contains a halogen.

Dust compositions can contain 1 to 30% by weight of a compound of Formula I. However, 3 to 15% by weight is preferred.

Particle size of the extender can vary considerably, but will ordinarily be somewhat under 50 microns in the finished formulation. Ureas and other fertilizers can be added to dust formulations to bring the concentration of active ingredient present down to 0.5 to 5% by weight of the total formulation.

The compounds of Formula I can be combined with diluents, carriers and adjuvants so as to form granules having a particle size of 8 to 60 mesh. Since the active compounds used in this invention are oils or low melting solids, granules employing these compounds can be prepared by spraying the active ingredient or a solution of the active ingredient over the surface of preformed clay granules or expanded vermiculite. Alternatively, a compound of Formula I can be mixed with finely divided clays and the mixture then granulated. In these compositions, the active ingredient will ordinarily be present at the rate of 1 to 25% by weight. However, 3 to 15% by weight is preferred.

To prepare pellets, the active ingredient and diluent are combined with sufficient liquid to permit extrusion of strands which can be cut and then dried or can be dried and then granulated. Surfactants can be included in this formulation up to about 20% by weight. It is preferred that such pelleted compositions contains 10 to 40% by weight of active ingredient.

In wettable powder compositions containing a compound of Formula I, one or more surfactants and an absorbent solid diluent, the active ingredient ordinarily will be present in a concentration in the range of 15 to 60% by weight. It is preferred to have 15 to 50% by weight of the active ingredient. Surfactants will be present in a range from .1 to 10% by weight to obtain adequate wetting and dispersion in water. Preferred surfactants are salts of alkylbenzene or alkynaphthalene sulfonic acids. Preferred dispersants are sodium and calcium lignin sulfonates and methylated cellulose. Surface deactivators, such as urea or hexamethylenetetramine can be present in the range of 0 to 5% by weight. The remainder of the composition can be made up of solid absorbent diluents as described above. Preferred diluents are kaolinite, attapulgite, diatomaceous earth and synthetic fine silica.

Wettable powders are prepared by mixing the ingredients in a blender and grinding the mixture in a hammer mill, air-impact mill or the like until the particle size has been reduced to make spray application practical and easy. These wettable powders can also be blended with additional diluents, such as talcs, to form the above-mentioned dust mixtures for direct, dry application.

Compositions of this invention can contain soil insecticides such as chlordane, DDT, dieldrin, endrin, aldrin, methoxychlor and others for simultaneous plant protection from insects and Rhizoctonia spp. in the soil. From 0.1 to 10 parts by weight of the insecticide is used for each one part by weight of a compound of Formula I.

Compositions of this invention can also contain other fungicides enabling the composition to control a broader spectrum of fungi. Illustrative of some of the other compounds which can be used are:

p-dimethylaminobenzenediazo sodium sulfonate;
quinone oxyaminobenzooxohydrazone;
tetraalkylthiuramsulfides such as tetramethylthiuram monosulfide or disulfide and tetraethylthiuram monoslufide or disulfide;
metal salts of ethylene bisdithiocarbamic acid, e.g., manganese, zinc, iron and sodium salts;
pentachloronitrobenzene;
dodecylguanidine acetate;
N-trichloromethylthiotetrahydrophthalimide (Captan®);
phenylmercury acetate;
2,4-dichloro-6-(o-chloroanilino)-s-triazine;
N-methylmercury-p-toluenesulfonanilide;
chlorophenolemercuri hydroxides;
nitrophenolmercuri hydroxides;
ethylmerucry acetate;
ethylmercury 2,3-dihydroxypropyl mercaptide;
methylmercury actate;
methylmercury 2,3-dihydroxypropyl mercaptide;
1,4-dichloro-2,5-dimethoxybenzene;
3,3'-ethylenebis(tetrahydro-4,6-dimethyl-2H-1,3,5-thiadiazine-2-thione);
methylmercury dicyandiamide;
N-ethyl-mercury-p-toluenesulfonanilide;
metal (e.g., iron, sodium and zinc) ammonium and amine salts of dialkyldithiocarbamic acids;
tetrachloronitroanisole;
hexachlorobenzene;
methylmercury nitrile;
tetrachloroquinone;
N-trichloromethylthiophthalimide; and
tetrachloroisophthalonitrile.

These additional fungicides will be present in the range of one-tenth to ten parts by weight for each one part by weight of a compound of Formula I.

The various kinds of formulations described above can be prepared with an insecticide or fungicide or both substituted for a portion of the active ingredient.

In addition compositions can contain special additives such as corrosion inhibitors, pigments, antifoam agents and the like.

APPLICATION

The compositions of this invention can be sprayed on or mixed into the soil. Soil applications are applied at or before planting, as a side dressing to living plants, in-the-row, as a hopper-box treatment or as a soil drench. The dosage is from 3 to 100 pounds of active ingredient per acre treated depending on method of application and soil type.

Good results are obtained by an in-the-row treatment. Treatment is directed on a band approximately two to four inches wide over an open furrow in such a way as to strike the sides of the furrow as well as the bottom of the furrow. Seed can then be planted and the furrow closed. The seeds, seedlings and growing plants are thus protected from attack by Rhizoctonia spp. From 0.07 to 5 pounds of active ingredient per 12,000 feet of a two-inch wide row gives satisfactory protection from the fungi.

A preferred dosage in-the-row because of exceptionally good control of fungi at low cost is one-tenth to one and one-half pound of active ingredient per 12,000 feet of a two-inch wide row. If the band width treated is more or less than two inches the dosage rate is adjusted accordingly. In-the-row treatment is extremely useful in protecting seeds, newly-germinated seedlings and growing plants of corn, cotton, tomatoes, watermelon, squash, carrots, lettuce, sugar beets, peppers, cucumbers, beans, soybean, ornamentals and the like from attack by Rhizoctonia spp.

Soil drench treatments protect seeds, seedlings, and plants from Rhizoctonia spp. by application of the compound used in this invention at rates of about 10 to 50 pounds of active ingredient per acre.

The compounds of this invention can also be used for seed treatments. For example, the active ingredient can be applied as a slurry to the surface of seeds alone or together with other seed protectants or disinfectants or can be mixed as a dust with seeds such as cottonseeds in the hopper-box treatment at planting time at rates of one to fifty ounces of active ingredient per cwt. of seeds to give protection from Rhizoctonia spp. A preferred rate of application, because of excellent control and low cost, is five to thirty ounces of active ingredient per cwt. of seeds.

In order that this invention can be better understood, the following additional examples are provided. It should be understood that all percentages given are by weight unless otherwise specified.

*Example 1*

A mixture of 27.9 parts of 2,2-bis(4-hydroxyphenyl)propane (Bisphenol A purchased from the Dow Chemical Company), 45 parts of acetone, 35 parts of anhydrous potassium carbonate and 33 parts of allylbromide are heated at reflux for one hour. The acetone is then removed by distillation, and the residue is taken up in ether. The ether solution is washed with dilute aqueous sodium hydroxide and then with water until the wash solution is neutral. The ether solution is then dried with anhydrous sodium sulfate, filtered and evaporated leaving 35 parts of essentially pure 2,2-bis(4-allyloxyphenyl)propane.

*Examples 2–11*

The following products of this invention are prepared according to Example 1 by the substitution of equivalent amounts of the indicated reactants for those of Example 1.

| Ex. | Bisphenol Reactant | Halide Reactant | Product |
|---|---|---|---|
| 2 | As in Example 1 | Propargylbromide | 2,2-bis[4-(2-propynyloxy)phenyl]propane. |
| 3 | ----do---- | 2,3-dichloropropene | 2,2-bis[4-(2-chloroallyloxy)phenyl]propane. |
| 4 | ----do---- | 1,3-dichlorobut-2-ene | 2,2-bis[4-(3-chloro-2-butenyloxy)phenyl]propane. |
| 5 | ----do---- | 1,2-dichlorobut-3-ene | 2,2-bis[4-(1-chloromethylallyloxy)phenyl]propane. |
| 6 | ----do---- | Chlorobut-2-ene | 2,2-bis[4-(2-buten-1-yloxy)phenyl]propane. |
| 7 | ----do---- | Chlorobut-2-yne | 2,2-bis[4-(2-butynyloxy)phenyl]propane. |
| 8 | 2,2-bis[4-hydroxyphenyl]butane [1] | Allylbromide | 2,2-bis-[4-allyloxyphenyl]butane. |
| 9 | 2,2-bis[4-hydroxyphenyl]butane | Propargylbromide | 2,2-bis[4-(2-propynyloxy)phenyl]butane. |
| 10 | ----do---- | 2,3-dichloropropene | 2,2-bis[4-(2-chloroallyloxy)phenyl]butane. |
| 11 | ----do---- | Chlorobut-2-yne | 2,2-bis[4-(2-butynyloxy)phenyl]butane. |

[1] Prepared according to Zinke and Goldman, Ann. 362, 205.

*Example 12*

| | Percent |
|---|---|
| 2,2-bis[4-(2-chloroallyloxy)phenyl]propane | 30 |
| Diatomaceous earth | 30 |
| Montmorillonite, calcined | 39 |
| Sodium alkylbenzene sulfonate | 1 |

The active ingredient, fluidized by warming, is sprayed slowly upon the solid ingredients while blending in a ribbon blender. To insure microscopic homogeneity, the mixture is passed through a hammer mill fitted with a large aperture screen. Little change in particle size of the diluents occurs in this treatment.

This dust can be diluted with inert finely divided solids prior to use or can be used directly in properly calibrated equipment.

*Example 13*

| | Percent |
|---|---|
| 2,2-bis[4-(2-butynyloxy)phenyl]propane | 6 |
| Synthetic fine silica | 3 |
| Kaolinite | 10 |
| Talc | 81 |

The ingredients, except talc, are mixed thoroughly in a blender. Talc is then added, blending is continued briefly and final blending is accomplished in a hammer mill as described in Example 12. This dust can be applied with conventional dusters or mixed with seed either in seed treating equipment or in a mechanical planter.

*Example 14*

By substituting 2,2-bis[4-allyloxyphenyl]propane for the active ingredient in Example 13 a practical dust is prepared.

*Example 15*

2-bis[4-(2-propynyloxy)phenyl]butane is substituted for the active ingredient in Example 13 and a practical dust is obtained.

*Example 16*

| | Percent |
|---|---|
| 2,2-bis[4-allyloxyphenyl]propane | 60 |
| Xylene | 32 |
| Blend of alkylarylsulfonates and polyoxy ethylene derivatives | 8 |

The above ingredients are combined and stirred to produce a homogeneous mix. This product can be extended with water for application.

*Example 17*

2,2-bis[4-allyloxyphenyl]butane is substituted for the propane derivative of Example 16 and a similar emulsifiable concentrate is obtained.

Example 18

| | Percent |
|---|---|
| 2,2-bis[4-(2-propynyloxy)phenyl]propane | 3 |
| Isoparaffinic hydrocarbon | 97 |

The above ingredients are stirred together to produce a solution which is applied directly for fungus control.

Example 19

| | Percent |
|---|---|
| 2,2-bis[4-allyloxyphenyl]propane | 10 |
| Expanded vermiculite (20/40 mesh) | 87 |
| Talc | 3 |

The active ingredient is fluidized by mixture with one part of methylene chloride and sprayed upon the vermiculite in a rolling drum. During evaporation of the methylene chloride, the talc is added. The granules are permitted to dry before packaging.

Example 20

2,2-bis[4-allyloxyphenyl]butane is substituted for the active ingredient in Example 19 to obtain similar fungicidal granules.

Example 21

| | Percent |
|---|---|
| 2,2-bis[4-allyloxyphenyl]propane | 25 |
| Synthetic fine silica | 10 |
| Attapulgite clay | 54 |
| Urea | 4 |
| Calcium lignin sulfonate | 4 |
| Sodium dioctylsulfosuccinate | 3 |

The above ingredients are thoroughly blended and then air reductionized to produce particles essentially all of which have a particle size of less than 5 microns. The product can be dispersed in water and applied as a slurry.

Example 22

| | Percent |
|---|---|
| 2,2-bis[4-allyloxyphenyl]propane | 50.0 |
| Diatomaceous earth | 47.5 |
| Sodium alkylnaphthalene sulfonate | 2.0 |
| Methylated cellulose | 0.5 |

The above ingredients are blended thoroughly and then passed through a hammer mill to produce a wettable powder of particles essentially all of which have a particle size of less than 50 microns.

Example 23

The 2,2-bis[4-allyloxyphenyl]propane of Example 22 is replaced with 2,2-bis[4-allyloxyphenyl]butane and a similar wettable powder is obtained.

Example 24

The formulation of Example 16 is diluted with water to form an emulsion containing one pound of active ingredient per ten gallons of emulsion. This is applied with a sprayer attached to a cotton planter. The spray is directed in such a way as to cover the sides and bottom of the furrow after the seed is in place. The rate of application is ten gallons of the diluted emulsion (one pound of active ingredient) per 12,000 linear feet of row. The furrow is then closed leaving the seed in contact with treated soil and with treated soil above. The cotton so treated germinates and emerges to a good stand of healthy seedlings. Adjoining rows planted at the same time and in the same way but left untreated have only a sparse stand due to attack by fungi of the genus Rhizoctonia.

Example 25

The granular formulation of Example 19 is spread broadcast with a fertilizer spreader at the rate of 200 pounds of commodity per acre and is immediately worked into the soil with a rotovator set at a depth of 6 inches. The treated area is then seeded in the usual fashion for green beans. The crop plants emerge to produce an excellent stand. On a similar area planted in the same manner without the granular formulation the crop stand is sparse. This is due to seedling kill by soil-borne fungi of the genus Rhizoctonia.

Example 26

The formulation of Example 13 is added to the hopper box of a cotton planter in alternating layers with the seed at a rate of ten pounds of the 6% dust per 100 pounds of seed. As the planter is operated in the field, the dust falls out with the seed into the furrow. Rows treated in this manner produce a full stand of thrifty cotton plants. Other rows planted in the same manner without the addition of the dust of Example 13, product an irregular stand of poor vigor, due to attack by fungi of the genus Rhizoctonia.

Example 27

Dust of the formulation in Example 12 is diluted with finely divided talc to provide a free-flowing preparation containing 5% of the active ingredient. This dust is applied with a duster mounted on a soybean planter in such a way that a 2 to 4 inch band over the furrow is treated just as the seed and the covering soil fall into place. The dust is applied at the rate of 20 pounds per 12,000 linear feet of soybean row. Soybeans treated in this way produce a uniform stand of the desired density. Soybeans planted in an adjoining area and in the same manner without the addition of the dust of Example 12 produce irregular and sparse stands that cannot make full use of the production capability of the site. Loss in stand is due to fungi of the genus Rhizoctonia.

Example 28

The wettable powder of Example 22 is added to water at the rate of 6 pounds (3 pounds active) per 100 gallons. The resulting suspension is sprayed over open furrows containing sugarcane seed pieces. The rate of application is 50 gallons (1.5 pounds active) per 12,000 linear feet of row. The furrows are then closed in such a way as to leave treated soil around and above the seed piece. Sugarcane treated in this way produces a uniform stand of plants. Sugarcane planted in an adjoining area of the same field but left untreated produces irregular stands due to attack by fungi of the genus Rhizoctonia.

The invention claimed is:

1. A method for protecting plants from soil fungi comprising applying directly to fungi infested soil a plant protectant amount of a compound of the formula

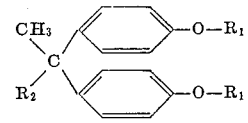

wherein $R_1$ is selected from the group consisting of allyl, chloroallyl, methylallyl, propargyl, and methylpropargyl; and $R_2$ is selected from the group consisting of methyl and ethyl.

2. The method of claim 1 in which the compound is 2,2-bis(p-allyloxyphenyl)propane.

3. The method of claim 1 in which the compound is 2,2-bis(p-allyloxphenyl)butane.

4. A method for protecting plants from soil fungi comprising applying to said fungi a plant protectant amount of a compound of the formula

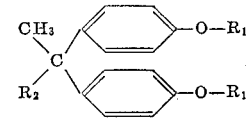

wherein

R₁ is selected from the group consisting of allyl, chloroallyl, methylallyl, propargyl and methylpropargyl; and R₂ is selected from the group consisting of methyl and ethyl.

5. The method of claim 4 in which the compound is 2,2-bis(p-allyloxyphenyl)propane.

6. The method of claim 4 in which the compound is 2,2-bis(p-allyloxphenyl)butane.

References Cited by the Examiner

UNITED STATES PATENTS 2,560,350 7/1951 Jelinek _____ 167—30
3,098,789 7/1963 Littler _____ 167—42

OTHER REFERENCES

Chemical Abstracts 59: 14117h (1963).

ALBERT T. MEYERS, *Primary Examiner.*
JULIAN S. LEVITT, *Examiner.*
JEROME D. GOLDBERG, *Assistant Examiner.*